Patented Jan. 5, 1932

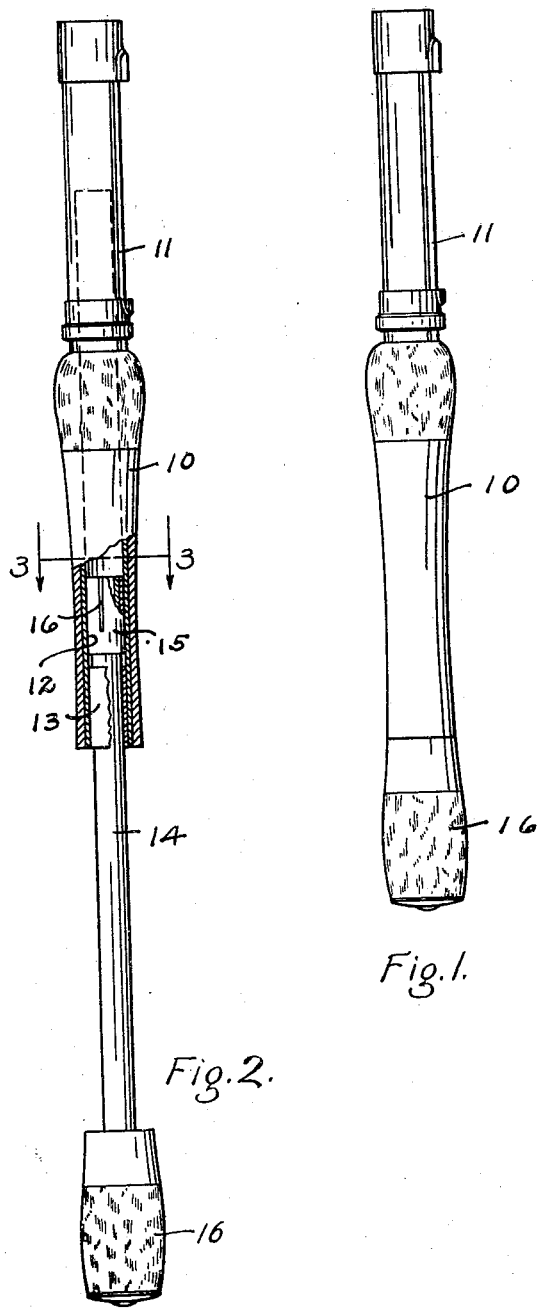

1,839,751

UNITED STATES PATENT OFFICE

AUGHE C. FENTON, OF INDIANAPOLIS, INDIANA

FISHING ROD HANDLE

Application filed September 23, 1930. Serial No. 483,879.

This invention relates to the art of fishing rods and particularly to the grip or handle thereof on rods intended for surf casting or deep sea fishing.

Rods for surf casting having heretofore been provided with handles in the neighborhood of thirty inches in length and a place for mounting the line reel beyond the handle. Such rods provided a handle convenient for casting heavy baits by reason of the long leverage but after casting difficulty arose in reaching out with one hand to operate the reel thirty inches beyond the body while the rod handle was held in the other hand against the body. Some operators overcame that difficulty and placed the reel within easier reach by slipping the major portion of the long handle back under the arm to project rearwardly therefrom. The operation of the rod in such a position however was extremely awkward in playing a fish and in danger of striking some other occupant of the boat by the projecting end.

My invention overcomes such difficulties and its primary object consists in providing a handle that may be long enough to give the desired leverage in casting and that may be shortened in length to bring the reel within easy operating distance. Further objects reside in the particular combination and new association of the elements entering into the structure.

These and other objects will become apparent in the following description of the invention as illustrated by the accompanying drawings, in which Fig. 1 is a side elevation of the butt or handle of a rod embodying my invention in a normal shortened position;

Fig. 2, a fragmentary side elevation of the handle in an extended position; and

Fig. 3, a transverse section on the line 3—3 in Fig. 2.

Referring to the drawings in which like characters of reference indicate like parts in the several views, I form a handle or grip 10 back of the reel seat 11 to have a metal tube 12 extending therethrough with a collar 13 inserted at the lower end and fixed in position. I provide a tubular shaft 14 which is passed through the collar 13 with a free sliding fit.

On the end of the shaft 14 within the tube 12, is fixed a collar 15 whereby the shaft 14 cannot be withdrawn from the tube 12 by reason of the rear end of the collar 15 striking the front end of the collar 13. I cut slots 16 through the end of the tubular shaft 14 and its collar 15, here shown as three in number and spread apart the three segments of the shaft and collar end so formed so that the segments will yieldingly contact the inner wall of the tube 12. A hand grip 16 is fixed on the outer end of the shaft 14.

When a cast is to be made, the grip 16 is grasped and pulled away from the handle 10 to withdraw the shaft 14 from within the tube 12, and after casting, the grip 16 is pushed toward the handle 10. By reason of the frictional engagement of the segment ends of the inner end of the shaft 14 and its collar 15, the shaft 14 remains wherever it is left and the grip 16 must be pulled or pushed to change its position.

While I have here shown and described my invention in the one form as now best known to me, it is obvious that structural changes may be made from that form without departing from the spirit of the invention, and I do not desire to be limited to that precise form, nor any more than may be required by the following claims.

I claim:

1. In a fishing rod handle, a grip having a hollow bore therein, a second grip, a shaft extending from the second grip and entered in said bore and adapted to slide therealong to permit said second grip to be brought up adjacent to said first grip, said shaft being fitted in said bore to prevent lateral movement of the shaft in the bore at any position of the second grip relative to the first grip whereby the second grip may be employed at varying distances from the first grip in casting to accommodate individual arm lengths of a caster.

2. In a fishing rod handle, a grip having a hollow bore therein, a second grip, a shaft extending from the second grip and entered in said bore and adapted to slide therealong to permit said second grip to be brought up adjacent to said first grip, said shaft being fitted in said bore to prevent lateral movement of the shaft in the bore at any position of the second grip relative to the first grip whereby the second grip may be employed at varying distances from the first grip in casting to accommodate individual arm lengths of a caster, and means for yieldingly holding the shaft at selected positions along said bore.

3. In a fishing rod handle, a grip having a hollow bore therein, a bushing in the outer end of said bore, a shaft slidably entered through said bushing, a collar on the end of the shaft within said bore having a normal close sliding fit therein, said collar being split to have sprung parts thereof in yielding frictional contact with the wall of said bore, and said bushing and said collar maintaining said shaft in axial alignment with said bore at all positions of the shaft therealong.

In testimony whereof I affix my signature.

AUGHE C. FENTON.